United States Patent [19]

Knoll

[11] Patent Number: 4,891,275
[45] Date of Patent: * Jan. 2, 1990

[54] ALUMINUM SHAPES COATED WITH BRAZING MATERIAL AND PROCESS OF COATING

[75] Inventor: Richard Knoll, Cocoa Beach, Fla.

[73] Assignee: Norsk Hydro a.s., Oslo, Norway

[*] Notice: The portion of the term of this patent subsequent to Oct. 7, 2003 has been disclaimed.

[21] Appl. No.: 879,581

[22] Filed: Jun. 27, 1986

Related U.S. Application Data

[63] Continuation of Ser. No. 570,845, Jan. 16, 1984, Pat. No. 4,615,952, Continuation-in-part of Ser. No. 437,884, Oct. 29, 1982, abandoned.

[51] Int. Cl.⁴ .................. F28F 21/08; C23C 2/00; B23K 1/20
[52] U.S. Cl. .................. 428/650; 428/658; 72/47; 228/208; 228/218
[58] Field of Search .......... 72/38, 46, 257, 47; 228/219, 220, 221, 263.17, 183, 208, 209, 218; 165/133; 29/527.4; 428/650, 658; 420/515

[56] References Cited

U.S. PATENT DOCUMENTS

| | | | |
|---|---|---|---|
| 722,273 | 3/1903 | Baldwin | 228/263.17 |
| 933,433 | 9/1909 | Guggenbuhl | 420/515 |
| 2,359,926 | 10/1944 | McCullough et al. | 228/263.17 |
| 2,414,312 | 1/1947 | Lee | 228/263.17 |
| 2,762,115 | 9/1956 | Gates | 29/527.4 |
| 2,898,230 | 8/1959 | Bulloff | 428/650 |
| 2,907,105 | 10/1959 | Ohmi | 420/515 |
| 2,927,856 | 3/1960 | Freedman | 420/515 |
| 3,373,482 | 3/1968 | Miller | 27/501 |
| 3,444,022 | 5/1969 | Bichsel | 72/46 |
| 3,457,630 | 7/1969 | Schwartz et al. | 228/263.17 |
| 3,582,478 | 6/1971 | Kelly et al. | 29/527.4 |
| 3,616,982 | 11/1971 | Dion | 228/263.17 |
| 3,648,358 | 3/1972 | Ziemek | 228/219 |
| 3,760,481 | 9/1973 | Greever | 228/36 |
| 3,945,554 | 3/1976 | Osterkorn et al. | 228/183 |
| 3,979,042 | 9/1976 | Peters | 228/221 |
| 4,115,604 | 9/1978 | Bernstein | 428/458 |
| 4,115,607 | 9/1978 | Hasegawa et al. | 72/46 |
| 4,130,232 | 12/1978 | Anderson | 228/183 |
| 4,186,474 | 2/1980 | Hine | 228/183 |
| 4,192,162 | 3/1980 | Zilges et al. | 72/38 |
| 4,326,662 | 4/1982 | Anderson | 228/183 |
| 4,377,024 | 3/1983 | Saperstein | 228/183 |

FOREIGN PATENT DOCUMENTS

| | | | |
|---|---|---|---|
| 24209 | 12/1961 | Japan | 228/263.17 |
| 144719 | 9/1962 | Japan | 420/515 |
| 37656 | 11/1970 | Japan | 420/515 |
| 17453 | 3/1973 | Japan | 420/515 |
| 88842 | 7/1979 | Japan . | |
| 195579 | 12/1982 | Japan . | |
| 154456 | 9/1983 | Japan . | |
| 629425 | 9/1949 | United Kingdom | 228/263.17 |
| 839864 | 6/1960 | United Kingdom | 420/515 |

OTHER PUBLICATIONS

"ZD Aluminum Tube", Showa Aluminum K.K., pp. 1–16.

"The Soldering of Sheet-Metal Heat Exchangers", M. K. Forbes, The Manufacture of Vehicle and Industrial Radiators, Apr. 1965, pp. 31–44.

Primary Examiner—John J. Zimmerman
Attorney, Agent, or Firm—Wenderoth, Lind & Ponack

[57] ABSTRACT

An aluminum or aluminum alloy shape for manufacture of heat exchangers is coated with a metallic layer of a zinc-base alloy constituting a fluxless soldering or low temperature brazing material when heated. A process for direct coating of formed aluminum shapes in nascent state includes the steps of providing a non-reactive atmosphere around the shape, providing a coating material of zinc-base alloy and bringing the aluminum shape and the coating material into contact and maintaining the contact at an elevated temperature for a predetermined period of time for forming a coherent coating on the aluminum shape.

10 Claims, 1 Drawing Sheet

ALUMINUM SHAPES COATED WITH BRAZING MATERIAL AND PROCESS OF COATING

This application is a continuation application of Ser. No. 570,845, filed Jan. 16, 1984 now U.S. Pat. No. 4,615,952, which is a continuation-in-part of application Ser. No. 437,884, filed Oct. 29, 1982, now abandoned.

FIELD OF THE INVENTION

The present invention relates to coated aluminum shapes, and more particularly to hollow aluminum shapes, e.g. tubes coated with a fluxless metallic layer, functioning as a soldering or low temperature brazing material when heated during assembling of the shapes to heat exchanging fins in the manufacture of heat exchangers, and to a process for coating of such aluminum shapes.

It is to be understood that the word aluminum as used in the present application is intended to mean aluminum and aluminum base alloys.

BACKGROUND OF THE INVENTION

Contact between tubes and heat exchanging fins in heat exchangers/radiators installed in cars is today ensured mainly by two methods-mechanical expansion of tubes, or brazing of tubes to heat exchanging fins. The reliable contact achieved by the mechanical expansion of the tubes can be achieved only when using substantially round tubes, which means limited heat performance of the heat exchangers. Brazed flat copper or brass tubes are largely used in car radiators, providing a good performance when the inexpensive well-known brazing technique is used.

There is an increasing trend in the automotive industry to replace steel and copper with lighter materials like aluminum or magnesium.

Soldering and brazing of aluminum to aluminum or to other metals is, however, a difficult task because of the presence of an aluminum oxide layer formed instantly on the surface of aluminum members exposed to the atmosphere. This oxide layer prevents formation of a tight metallic bond between brazed members because of its poor wetting properties.

In practice it is therefore necessary to pretreat the aluminum surface prior to soldering/brazing in order to remove the aluminum oxide. Different methods are used for removing the oxide layer, depending on the subsequent use of the aluminum members. A method called flux brazing is widely used where the aluminum members are immersed in a bath of molten salt and brazing flux or exposed to the brazing flux which removes the oxide layer from the preheated members. The method is quite efficient with regard to the oxide removal, but it is practically impossible to avoid that the flux is entrapped at the brazed joints representing a serious corrosion problem.

Moreover, the brazing material commonly used is an Al-Si alloy which is a high temperature brazing alloy. In practice when the units to be brazed are assembled with the parts in position on the coated tubes, the assembly is then placed in a vacuum furnace and heated. However, the melting temperature of this brazing alloy is around 1050° to 1100° F. which is not far below the melting point of aluminum, and as a result the temperature must be very closely controlled. But the silicon from the brazing alloy vaporizes and tends to deposit on surfaces within the heating apparatus, including the temperature sensors, thereby making control uncertain at best. Thus the process is not very reliable or efficient.

Fluxless brazing processes have been conducted successfully in vacuum or inert atmosphere and are described in U.S. Pat. Nos. 3,373,482 and 3,979,042.

The common drawback of these processes is that the necessity of cleaning/pretreating procedures is not eliminated and rather high temperatures are required in order to break down the oxide layer or to create cracking in this layer. These processes are therefore expensive and limited to special applications.

OBJECT OF THE INVENTION

It is therefore an object of the present invention to provide coated aluminum shapes, particularly hollow shapes, e.g. tubes having a fluxless coating of soldering or brazing material for fluxless soldering/fluxless brazing at low temperatures, and to provide a process for direct coating of aluminum shapes having an oxide-free, non-pretreated surface.

Another object of the invention is to provide aluminum shapes precoated with soldering or brazing material ensuring improved corrosion resistance of the shapes, such shapes being thus particularly suited for brazed aluminum heat exchangers. By shapes is meant elongated aluminum members having a cross-sectional shape such as an angle, an I or H beam, a flange, or any other of the many shapes in which elongated aluminum members are formed, and particularly hollow shapes, e.g. tubes with various cross-sectional shapes-round, flat oval etc., optionally provided with inner partition walls or multicavities.

SUMMARY OF THE INVENTION

The aluminum shapes according to the present invention provided either by extruding the aluminum in the desired shape and dimension or by any other methods of forming the shapes from aluminum are coated with a metallic layer which constitutes a fluxless soldering or brazing material for the subsequent fluxless soldering or low temperature brazing of the shapes to other structural elements, e.g. soldering or brazing of tubes to heat exchanging fins in the manufacture of heat exchangers. The soldering or brazing material applied as the coating layer consists of a zinc-base alloy.

The composite shape according to the invention is suitable for use in the manufacture of heat exchangers, and comprises an aluminum or aluminum alloy core formed by a process in which the surface of the core which is formed is substantially free of oxide, and an outer layer of fluxless soldering material of zinc or zinc base alloy which has been deposited on the said aluminum core in a thickness sufficient for acting as a fluxless solder in a subsequent operation of joining the core to another member, the deposition having been carried out with the soldering material in a molten state while the metal of the core is in a nascent state for causing a portion of the soldering material which is toward the core surface to diffuse into the aluminum core for interbonding the soldering material to the aluminum core.

The process of the present invention comprises the steps of forming aluminum in the desired shape, preventing contact between the surface of the formed shape and the atmosphere for avoiding oxidation of the surface prior to the subsequent coating of the outer surface with a metallic layer, and then carrying out coating of the outer surface of the shape with a metallic layer.

More particularly, the method of making the above-described composite shape suitable for use in the manufacture of heat exchangers, comprises forming an aluminum or aluminum alloy core by a process in which the core surface in a nascent state is kept substantially free of oxide, and depositing an outer layer of fluxless soldering material of zinc or zinc base alloy on said surface of the core in a molten state while the metal of said surface is in the nascent state, to cause the soldering material to diffuse into the aluminum core for interbonding the soldering material to the aluminum core, and the depositing being in a thickness sufficient for acting as a fluxless solder in a subsequent operation of joining the core to another member.

BRIEF DESCRIPTION OF THE DRAWING

The invention will now be described in greater detail in connection with examples and the accompanying drawing, FIG. 1, which is a schematic representation of the process and the apparatus for carrying it out.

DETAILED DESCRIPTION OF THE INVENTION

Figure 1:
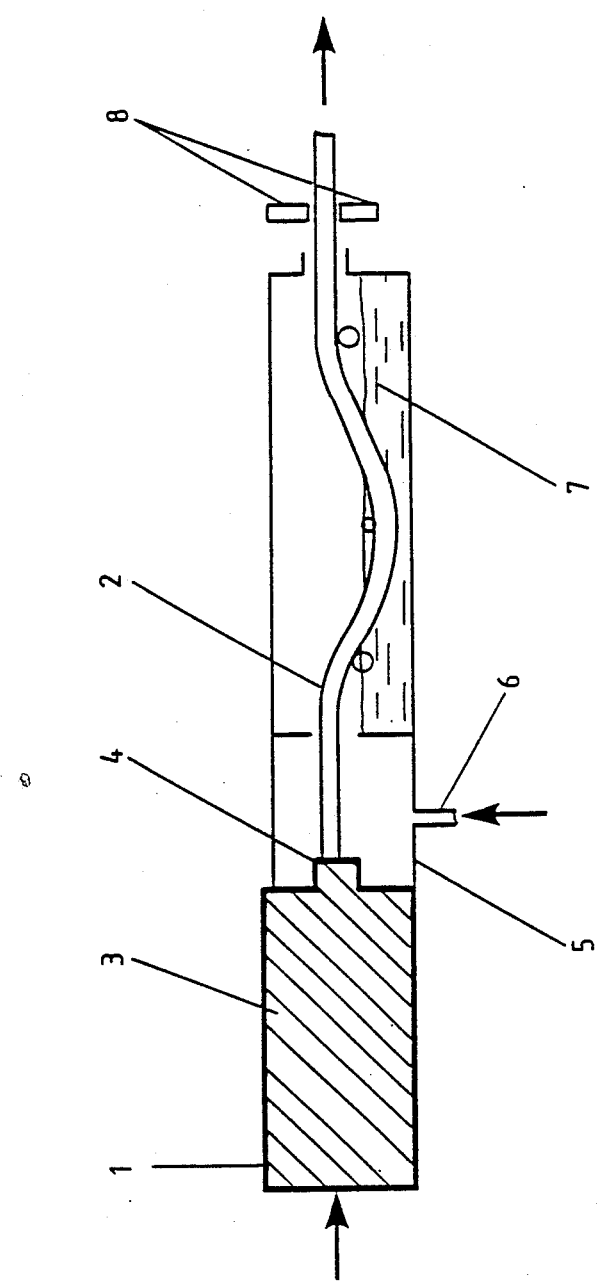

A soldering/brazing coating provided on aluminum shapes according to the present invention is a zinc-base alloy, preferably ZnAl alloy, comprising from 1.0–10.0 wt % Al and from 0 to 3.0 wt % Cu, the balance being zinc. This alloy composition allows conducting of low temperature coating, approximately at 725°–790° F., and consequently low temperature and low cost brazing of the coated tubes to heat exchanging fins during assembling of heat exchangers. The addition of Al, preferentially from 3.0 to 6.0 wt %, improves the wetting of aluminum by molten zinc and in combination with Cu results in a sufficiently ductile coating of high tensile strength of the shapes in cold state.

EXAMPLE 1

A drawn aluminum tube was mechanically cleaned of its surface oxides in a protective atmosphere of nitrogen and then passed directly, i.e. while still in the nitrogen protective atomosphere, into a molten bath of zinc alloy comprising 5.8 wt % Al, 1.0 wt % Cu and the balance mainly zinc. The zinc bath temperature was kept at 840° F. in order to avoid an excessive solidification of zinc on cold aluminum. After a 3 sec. contact time the tube was removed from the zinc bath and then cooled by water spray. A coherent layer of zinc coating was achieved on the thus treated drawn aluminum bath.

The apparatus for carrying out the particular coating method according to the present invention as shown in FIG. 1, comprises a forming apparatus, e.g. an extruder (1), for forming an aluminum member (2) in a desired form, expecially that of a tube, from aluminum (3) supplied thereto. Surrounding the exit from the extrusion die (4) of the extruder and in substantially gas-tight relation with the end of the extruder from which the die extends, is an oxidation preventing chamber (5) to which an oxidizing preventing gas is supplied through an inlet (6), e.g. an inert gas such as nitrogen. It is sufficiently short so that the extruded shape does not cool below the desired coating temperature before it passes out of the chamber. From the oxidation preventing chamber the extruded aluminum shape is passed into a means for coating the shape, e.g. a bath (7) of soldering or brazing metal without being exposed to the atmosphere, i.e. so that it is prevented from being oxidized. In a specific embodiment of the apparatus of the invention, this is done by attaching the bath directly to the outlet end of the oxidation preventing chamber (5). In this specific embodiment the thus coated aluminum shape can then be passed through a conventional wiper (8) to wipe excess coating metal therefrom, and then cooled, either by being cooled in the ambient atmosphere or passed through a cooling means such as a water quenching apparatus (not shown).

This means for applying the coating is here shown as a bath (7) through which the aluminum shape (2) is directly passed. However, a variety of known coating processes such as dipping, spray-coating, and flash vaporization can be used within the scope of the present invention. Care must be taken that the extruded shape is not exposed to the ambient atmosphere or other oxidizing atmosphere between the time it leaves the extruder and the time it is coated.

The extruded shapes in status nascendi, i.e. the nascent state, after leaving the extrusion die are free of oxide on all surfaces and remain at a temperature of approximately 750°–800° F. so that an additional heating of the shapes is not required. The resulting coated aluminum shapes offer a corrosion resistant, leak-proof tubing particularly suited for heat exchangers.

A further advantageous characteristic which is given by the present method to the extruded shapes as compared with conventional coating methods is improved workability. In the prior art process when the extruded aluminum shape is preheated prior to application of brazing flux or immersed in a bath of molten salt and brazing flux in order to remove the oxide coating the aluminum is heated sufficiently, which causes grain growth in the aluminum, thereby reducing the workability. In the method of the present invention, since coating takes place immediately after extrusion without an intermediate heating step, there is insufficient time for any significant grain growth.

EXAMPLE 2

A hollow aluminum tube having a flat, oval cross-section is extruded from a conventional extruder at a temperature of about 950° F., and is passed directly, i.e. without being exposed to the ambient atmosphere, into an oxide preventing chamber connected in substantially gas-tight relation to said extruder around the extrusion die thereof. The chamber is filled with nitrogen and is about 70–100 cm long. At the end of the chamber the tube has cooled to about 750° F., an excellent temperature for applying a soldering or brazing material thereto. The thus cooled tube is then passed directly, i.e. without being exposed to the ambient atmosphere, into a bath of a Zn-Al fluxless soldering alloy composed of Al in an amount of about 3.5 to 4.5 wt %, Cu in an amount of about 2.5 to 3.5 wt %, Mg about 0.05 wt % and the balance Zn, which is at a temperature of from 715°–720° F.

Thereafter the thus coated tube is passed through a conventional wiper in which the excess coating metal is wiped from the tube, and then the tube is cooled in the atmosphere.

The thus completed tube can then be easily fabricated into a structure by having pieces soldered thereto. For example, where the tube is to form the core tube of a radiator, the fins can be positioned on the tube and the tube simply passed through a heating chamber at about 750° F., whereby the fins will be soldered the tube. No soldering flux need to be used and the soldering temperature is very low compared to the prior art which means low cost assembling of the radiators.

I claim:

1. A composite shape suitable for use in the manufacture of heat exchangers, said shape comprising an aluminum or aluminum alloy core formed by a process in which the surface of the core which is formed is substantially free of oxide, and an outer layer of fluxless soldering material of zinc or zinc base alloy which has been deposited on the said aluminum core in a thickness sufficient for acting as a fluxless solder in a subsequent operation of joining the core to another member, the deposition having been carried out with the soldering material in a molten state while the metal of the core is in a nascent state such that a portion only of the soldering material which is toward the core surface is diffused into the aluminum core, thereby interbonding the soldering material to the aluminum core.

2. A composite shape as claimed in claim 8, wherein said core is an extruded hollow shape.

3. A composite shape as claimed in claim 8, wherein said core is a drawn hollow shape which has been subsequently heated up to a temperature equal to or higher than the melting point of the soldering material.

4. A composite shape as claimed in claim 1, wherein the entire surface of said core is covered by the soldering material.

5. A method of making a composite shape suitable for use in the manufacture of heat exchangers, said method comprising forming an aluminum or aluminum alloy core by a process in which the core surface in a nascent state is kept substantially free of oxide, and depositing an outer layer of fluxless soldering material of zinc or zinc base alloy on said surface of the core in a molten state while the metal of said surface is in the nascent state, to cause a portion the soldering material to diffuse into the aluminum core for interbonding the soldering material to the aluminum core, and the depositing being in a thickness sufficient for acting as a fluxless solder in a subsequent operation of joining the core to another member.

6. A method as claimed in claim 5, wherein said forming of the core is by a continuous forming process, and said outer layer is formed by a continuous deposition process in line with said forming process.

7. A method as claimed in claim 6, wherein said forming of the core comprises extruding a hollow shape.

8. A method as claimed in claim 6, wherein said forming of the core comprises drawing a hollow shape and subsequently heating it up to a temperature equal to or higher than the melting point of the soldering material.

9. A method as claimed in claim 5, wherein the soldering material is deposited at a temperature above the melting point of the soldering material and up to 840° F.

10. A method as claimed in claim 5, wherein said depositing comprises deposition soldering material on the entire suface of said core.

* * * * *